United States Patent [19]

Lebedev et al.

[11] Patent Number: 4,712,724

[45] Date of Patent: Dec. 15, 1987

[54] METHOD OF FRICTION WELDING

[76] Inventors: Vladimir K. Lebedev, ulitsa Engelsa, 25, kv. 12; Ivan A. Chernenko, ulitsa Lomonosova, 24, kv. 125; Alexandr T. Dyshlenko, ulitsa Vasilkovskaya, 49, korpus 3, kv. 14; Leonid V. Litvin, ulitsa Vernadskogo, 87, kv. 46; Vladimir I. Tishura, ulitsa Chigorina, 55, kv. 27, all of, Kiev, U.S.S.R.

[21] Appl. No.: 930,663

[22] Filed: Nov. 12, 1986

[51] Int. Cl.$^4$ .............................................. B23K 27/00
[52] U.S. Cl. .................................................. 228/112
[58] Field of Search ........................ 228/112, 113, 114

[56] References Cited

U.S. PATENT DOCUMENTS

| | | | |
|---|---|---|---|
| 3,678,566 | 7/1972 | Ellis et al. ............................ | 228/112 |
| 3,753,286 | 8/1973 | Lilly et al. ........................... | 228/112 |
| 3,954,215 | 5/1976 | Takagi et al. ........................ | 228/112 |

FOREIGN PATENT DOCUMENTS 1209398  2/1986  U.S.S.R. .

OTHER PUBLICATIONS cf. V. I. Vill "Friction Welding of Metals", Leningrad, Mashinostroenie, 1970, p. 61.

Primary Examiner—M. Jordan
Attorney, Agent, or Firm—Lilling & Greenspan

[57] ABSTRACT

A method of friction welding wherein the parts to be welded, of materials with inherent Young's moduli, are jigged coaxially, set to rotate with respect to each other under an axial pressure recurrently varying with a frequency which is in inverse proportion to the lower value of the Young's moduli and to the diameter—or to the smaller diameter—of the parts while these are being heated up for welding, whereby, the value of the frequency varies over a range between + and −15% and the parts are then upset-forged together.

2 Claims, 2 Drawing Figures

METHOD OF FRICTION WELDING

BACKGROUND OF THE INVENTION

1. Field of the Invention

The invention relates to methods of pressure welding and has specific reference to friction welding.

The present invention may be of utility in mechanical and electrical engineering, tool manufacture and in the chemical industry.

2. Description of the Prior Art

The invention holds out special promise in friction welding of materials with distinctly different mechanical and thermal properties and those which tend to form scale at their end faces. Friction welding under constant axial pressure is inapplicable in the above cases due to non-uniform distribution of the temperature pattern over the cross section of the parts welded, which impairs weld quality. The known methods of friction welding under a pulsatory axial pressure provide for a better distribution of the temperature pattern over the heat-affected zone. However, no adequate uniformity in the distribution of the temperature pattern can be obtained in welding materials with distinctly different mechanical and thermal properties. Poor penetration at the centre and periphery of the weld is likely to occur in this case.

Known in the art is a method of friction welding (cf. V.I. Vill "Friction Welding of Metals", Leningrad, Mashinostroenie, 1970, p. 61 wich is realized practically in all friction welding machines. It consists in jigging coaxially the parts to be welded, setting them to rotate with respect to each other under a constant axial pressure and upset-forging the parts together on heating up the weld area adequately.

The known method fails to provide for a uniform redistribution of the temperature pattern over the weld area when dissimilar materials having distinctly different mechanical and thermal properties are being welded. Weld quality and reliability consequently suffer. A high axial pressure applied during the welding may bring about an X-shaped distortion of the heat-affected zone resulting in poor penetration at the centre. A low axial pressure may cause convexity of the heat-affected zone accompanied by poor penetration at the periphery of the weld.

Also known is a method of friction welding (cf. USSR Inventor's Certificate No. 1209398, IPC B23K 20/12, published in 1986) consisting in jigging coaxially the parts to be welded the materials whereof have inherent Young's moduli, setting the parts to rotate with respect to each other under an axial pressure which varies recurrently in order to heat the parts up and upsetforging the parts together on heating them up.

In this method of welding, the axial pressure applied in order to heat up the work changes from a minimum value to a maximum one during every period of a different frequency. Consequently the value of the maximum pressure rises incessantly. This fact widens the field of application of the method, rendering the machines capable of welding the parts with a diameter which is larger than one for which they have been designed. However, a variable frequency with which the axial pressure is recurrently changed fails to provide for a redistribution of the temperature pattern in a way eliminating poor and non-uniform heating up of the weld zone.

A rise in the axial pressure to a maximum value in the course of several applications brings about a thermal effect during the heating up which changes in the direction from the centre to the periphery of the weld in materials with distinctly different mechanical and thermal properties. Poor penetration at the periphery and an unjustified lengthening of the heating up period are likely to occur.

SUMMARY OF THE INVENTION

It is an object of the invention to provide a method of friction welding which would intensify the process.

Another object of the invention is to improve weld quality, preferably in welding materials with distinctly different mechanical and thermal properties.

These objects are realized in a method of friction welding effected by jigging coaxially the parts of materials with inherent Young's moduli for welding, setting them to rotate with respect to each other under an axial pressure varying recurrently in the course of heating up and upset-forging the parts together whereby in accordance with the invention the recurrently variable axial pressure is applied to the parts in the course of heating them up with a frequency which is in inverse proportion to the lower value of the Young's moduli and to the diameter—or to the smaller diameter—of the parts and the value of the frequency varies over a range between + and −15%.

It is expedient to measure—in the event of scale formation at the end face of at least one of the parts—the friction torque set up in the course of heating up the parts, discontinue the application of the axial pressure varying recurrently with a set frequency when the friction torque acquires a steady-state value and apply a constant axial pressure to the parts until they begin to become upset-forged together.

Owing to the disclosed method of friction welding the temperature pattern is redistributed towards and away from the centre alike. As a result, the process is intensified and the parts are uniformly heated up over the entire cross-sectional area. A uniform thermal impact the heat-affected zone is exposed to improve weld quality, specifically when the metals welded have distinctly different properties—as this is the case in welding vanadium and steel, molybdenum and tungsten—or when scale is formed on the work.

BRIEF DESCRIPTION OF THE DRAWINGS

A preferred embodiment of the invention will now be described with reference to the accompanying drawings in which.

DESCRIPTION OF THE PREFERRED METHOD

The disclosed method of friction welding can be realized on any known machine, a conventional or an inertia-type machine, and is essentially as follows.

The parts to be welded of materials with inherent Young's moduli are jigged coaxially and set to rotate with respect to each other. They may have the same or different diameters and their materials may be dissimilar with distinctly different properties such as melting point, ultimate strength, hardness, Young's modulus, etc. An axial pressure is applied to the parts welded which varies recurrently with a frequency determined by the mechanical and thermal properties of the materials of the parts and by their diameters. To be more precise, the frequency is inversely proportional to a the lower value of the Young's moduli of the materials of the parts and to the diameter—or to the smaller diameter—of the parts which is decided by the required strength of the weld, whereby the value of the frequency also varies over a range between + and −15%. The value of the frequency, f, of applications of the axial pressure $P_1$ is given by the formula derived experimentally:

$$f = \frac{8 \cdot 10^6}{Ed} \pm 15\% \text{ Hz}$$

where E is the lower value of the Young's moduli, MPa, and d is the smaller diameter of the parts welded, mm.

Figure 1:
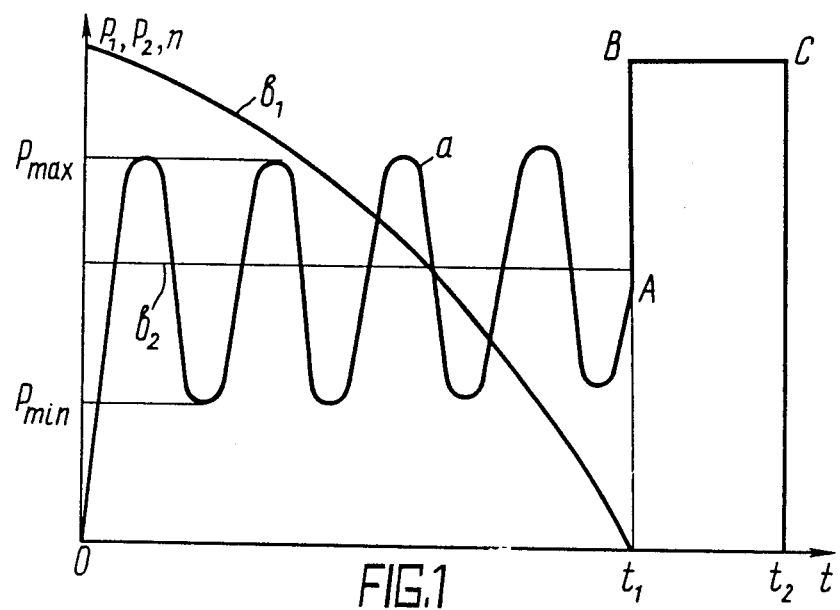
FIG. 1 is a graph showing the way in which axial pressure, the pressure required to upset-forge the parts together, and the speed of rotation vary with time during the process of friction welding according to the invention.

FIG. 1 illustrates the relationship between such variables as the axial pressure $P_1$ applied during the heating up of the parts subjected to friction welding (segment OA, curve a), the pressure $P_2$ applied in order to upset-forge the parts together (segment BC, curve a), the speed of rotation n during inertia-type welding (curve $b_1$) and conventional welding (straight line $b_2$) which are all plotted on the ordinate and the time t plotted on the abscissa. It will be noted that the axial pressure $P_1$ rises in the beginning from zero to a maximum $P_{max}$ which is constant during every period and is decided by the mechanical and thermal properties of the materials of the parts and by their dimensions, roughly equalling the value of the constant axial pressure used during friction welding. After that the pressure decreases to a value $P_{min}$ which is chosen on condition that the oxide films be removed from the weld zone. Variations in the axial pressure $P_1$ go on to recur with a set frequency f until an instant of time $t_1$ when, in the case of inertia-type friction welding, the relative rotary motion of the parts is discontinued (the speed n decreases from a maximum to zero, curve $b_1$) or, in the case of conventional friction welding, the parts are stopped (the speed n is constant up to the instant $t_1$ and becomes then zero, straight line $b_2$). The number of periods of application of the axial pressure $P_1$ is determined experimentally for given materials.

The variable axial pressure can be applied on any known friction welding machine by any means: hydraulic, pneumatic or electromagnetic.

By applying a recurrent axial pressure with the above-indicated frequency in the course of heating up the parts, the zone of maximum heat generation travels over the surface of friction between the parts welded. Owing to that the parts welded. Owing to that the flow stress decreases, the oxide and greasy films are destroyed and a weld with a fine-grained homogeneous structure is formed. The period of heating up the parts for welding shortens, for a uniform temperature pattern is achievable not only by virtue of heat conduction in the materials but by a travelling zone of maximum heat generation which displaces from the centre of the weld to its periphery and in the reverse direction.

The effect of the recurrently variable axial pressure decreases if the frequency exceeds the calculated value by more than 15% because of the rate of displacement of the zone of maximum heat generation failing then to coincide with that of the axial pressure variation.

On ceasing to apply the axial pressure $P_1$, a constant pressure $P_2$ (segment BC, curve a) causing the parts to upset-forge together is applied. It equals or exceeds the maximum pressure $P_{max}$ and is applied up to an instant $t_2$ which is determined experimentally.

Figure 2:
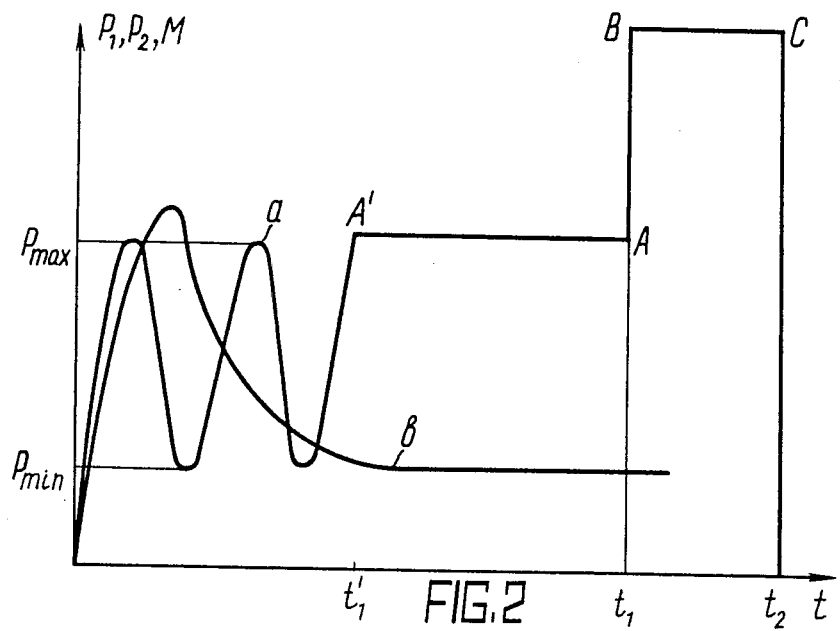
FIG. 2 is a graph showing the way in which axial pressure and friction torque vary with time when scale is formed at the end face of at least one of the parts during the process of friction welding according to the invention.

If scale is formed at the end face of at least one of the parts welded, the friction torque M set up in the course of heating up is measured by any known means. FIG. 2 illustrates the way in which M varies with time (curve b) and also the relationship between the axial pressure $P_1$ (segment OA, curve a) and the upset-forging pressure $P_2$ (segment BC, curve a) which are laid off as ordinates and time t laid off as abscissa.

Referring to curve b of FIG. 2, the friction torque M sharply rises in the beginning and gently lowers to a constant value which becomes evident at the time $t_1'$. The recurrently variable axial pressure $P_1$ applied with the set frequency f before the instant $t_1'$ as described hereinabove destroys the layer of scale and disposes it of from the weld zone. Further heating of the parts up to the instant $t_1$ is effected under a constant axial pressure $P_1$ which equals or approaches the value of $P_{max}$. The upset-forging pressure $P_2$ is then applied up to the instant $t_2$ (segment BC, curve a) as described hereinabove.

The invention will be best understood from the examples of its preferred embodiment given below.

EXAMPLE 1

Vanadium and low-carbon steel parts with a diameter d=30 mm were friction welded in the conventional way. The composition of the steel in wt % was as follows: C, 0.25–0.28; impurities, ≦1; Fe, the balance. Assuming that Young's modulus of vanadium was $E_1 = 1.33 \cdot 10^5$ MPa and that of steel was $E_2 = 2.0 \cdot 10^5$ MPa, the value of $E_1$ was used to compute the frequency f of axial pressure variations. The parameters of welding were as follows: n=100 s$^{-1}$; $P_{max}$=100 kN; $P_{min}$=20 kN; $P_2$=200 kN; f=2 Hz. The tensile test of the work which had been welded under the axial load applied with a frequency within the range of ±15% of the computed value of f ended in failure of the vanadium part. The tests of the work welded by using a frequency outside the specified 15-percent range, e.g. with a frequency f≧2.3 Hz and f≦1.7 Hz, ended in failure of the weld.

EXAMPLE 2

Two structural steel parts with diameters $d_1$=16 mm and $d_2$=50 mm were friction welded in the conventional way whereby scale was formed at the end faces. The composition of the steel in wt % was as follows: C, 0.4; Cr, 1; Fe, the balance. Young's modulus of the steel was E=2.0·10$^5$ MPa. The smaller diameter, $d_1$=16 mm was used to compute the frequency. The parameters of welding were as follows: n=100 s$^{-1}$; $P_{max}$=25 kN; $P_{min}$=15 kN; $P_2$=40 kN; f=2.5 Hz. No satisfactory welds were obtained when the value of f was greater than 2.8 Hz and smaller than 2.1 Hz. The friction torque M was measured and a constant axial pressure of 25 kN was applied after the friction torque had become constant.

EXAMPLE 3

A part of heat resistant steel (composition in wt %: C, 0.45; Cr, 14; Ni, 14; V, 2; Fe, the balance) with a diameter d=16 mm was friction welded on an inertia type machine with a part of structural steel (composition in wt %: C, 0.4; Cr, 1; Fe, the balance) and with the same diameter. Young's modulus of the heat-resistant steel was $E_1 = 2.3 \cdot 10^5$ MPa and that of the structural steel was $E_2 = 2.0 \cdot 10^5$ MPa. The frequency f of axial pressure variations was computed on the basis of $E_2$. The parameters of welding were as follows: $n = 270$ s$^{-1}$; $P_{max} = 20$ kN; $P_{min} = 13.5$ kN; $P_2 = 35$ kN; $f = 2.5$ Hz. The weld was completed in $t_2 = 4$ s whereas the welding on an inertia type machine under a constant axial pressure $P_1 = 20$ kN took a period of $t_2 = 5.1$ s.

What is claimed is:

1. A method of friction welding comprising the steps of:
    jigging coaxially the parts to be welded end face-to-end face having diameters which are the same or different and the materials of which have inherent Young's moduli;
    setting said parts to be welded to rotate with respect to each other;
    applying to said parts to be welded, while heating up said parts so as to accomplish friction welding, an axial pressure recurrently varying with a frequency which is in inverse proportion to the smaller value of said Young's moduli of said materials of said parts welded and to said diameter or the smaller of said different diameters, whereby the value of said frequency varies over a range between + and −15%; and upset-forging said parts welded together.

2. A method of friction welding as claimed in claim 1 wherein in the event of scale formation at said end face of at least one of said parts welded in the course of said heating up for said friction welding, the steps of
    measuring the friction torque set up in this case;
    discontinuing said axial pressure recurrently varying with said frequency when the value of said friction torque acquires a steady-state value; and
    applying a constant said axial pressure to said parts welded until said parts begin to be upset-forged together.

* * * * *